United States Patent [19]

Gellert

[11] Patent Number: 5,235,737
[45] Date of Patent: Aug. 17, 1993

[54] METHOD OF MAKING AN INJECTION MOLDING NOZZLE WITH A HEATING ELEMENT EXTENDING OUTWARD BETWEEN ADJACENT COLLAR PORTIONS

[76] Inventor: Jobst U. Gellert, 7A Prince Street, Georgetown, Ontario, Canada, L7G 2X1

[21] Appl. No.: 997,243

[22] Filed: Dec. 28, 1992

Related U.S. Application Data

[63] Continuation-in-part of Ser. No. 835,524, Feb. 14, 1992, abandoned.

[30] Foreign Application Priority Data

Dec. 13, 1991 [CA] Canada .................. 2057594
Dec. 4, 1992 [CA] Canada .................. 2084296

[51] Int. Cl.5 ............................ H05B 3/00
[52] U.S. Cl. ........................ 29/611; 29/619; 219/424; 219/426; 264/328.15; 425/549
[58] Field of Search ............ 29/611, 619, 621; 219/421, 424, 426; 338/62, 63, 270, 303; 264/328.15; 425/549

[56] References Cited

U.S. PATENT DOCUMENTS

| | | |
|---|---|---|
| 2,088,586 | 8/1937 | Cole et al. |
| 2,379,530 | 7/1945 | Lederer |
| 2,794,504 | 6/1957 | Carpenter |
| 3,550,267 | 12/1970 | Williams ................ 29/611 |
| 4,386,262 | 5/1983 | Gellert .................. 29/611 |
| 4,403,405 | 9/1983 | Gellert .................. 29/611 |
| 4,557,685 | 12/1985 | Gellert ................ 425/549 |
| 4,795,126 | 1/1989 | Crandell ............... 29/611 |
| 4,837,925 | 6/1989 | Gellert .................. 29/619 |
| 4,865,535 | 9/1989 | Gellert ................ 425/549 |
| 4,945,630 | 8/1990 | Gellert .................. 29/611 |

Primary Examiner—P. W. Echols
Attorney, Agent, or Firm—Dalesman & Company

[57] ABSTRACT

A method of making an injection molding nozzle having an electrical heating element wound in a channel. The heating element has two terminal wires which extend radially outward parallel to each other from either a common end portion or two separate end portions of the heating element. After the heating element is wound in the spiral channel in the nozzle body, forward and rear collar portions are mounted around the nozzle body to form a radial slot or opening between them through which the end portion or portions of the heating element project. A stud portion is mounted to extend radially outward from the slot with a single bore or two parallel bores through which the end portion or portions extend. These components are then brazed together in a vacuum furnace to form a strong integral structure with the end portion or portions of the heating element secured in place. In one embodiment, a spacer portion having two parallel bores is mounted with ceramic paste to the stud portion. The two terminal wires extend out through the bores for connection in a threaded cap to a pair of external lead wires.

15 Claims, 4 Drawing Sheets

METHOD OF MAKING AN INJECTION MOLDING NOZZLE WITH A HEATING ELEMENT EXTENDING OUTWARD BETWEEN ADJACENT COLLAR PORTIONS

This is a continuation in part of application Ser. No. 07/835,524 filed Feb. 14, 1992 now abandoned.

BACKGROUND OF THE INVENTION

This invention relates generally to injection molding and more particularly to a method of making an integral nozzle with an integral heating element extending outward between adjacent collar portions.

Injection molding nozzles having a helical integral electrical heating element extending around the central melt bore are well known in the art. As seen in the applicant's U.S. Pat. No. 4,865,535 which issued Sep. 12, 1989, it is also known to have a portion of the heating element swaged back upon itself to provide more heat in certain areas. Of course, each nozzle must have a terminal to which external lead wires are connected to provide power to the heating element. In the past, this has usually been provided by the heating element having end portions which extend outward through a radial opening in a collar portion adjacent the rear end of the nozzle. An example of this is seen in the applicant's U.S. Pat. No. 4,386,262 which issued May 31, 1983. In this case, a so called "hot" terminal is formed by casting beryllium copper around the heating element in a radially extending sleeve. While this terminal is structurally sound, it has the disadvantage that the terminal is too hot which results in possible damage due to overheating of the external lead wires or other adjacent materials. Another example of the end portions of the heating element extending outward through an opening in the collar portion is shown in the applicant's U.S. Pat. No. 4,403,405 which issued Sep. 13, 1983. In this case, half washers mounted in the opening around the heating element prevent the conductive beryllium copper flowing out into the terminal. While this overcomes the problem of the terminal overheating and thus is a so called "cold" terminal, it has the disadvantage that the terminal is not as strong structurally and it is difficult to ensure the terminal extends straight out from the nozzle.

Another example of a method of making a terminal in which the end portion of a heating element has to be run out through a hole in the collar portion is described in the applicant's U.S. Pat. No. 4,837,925 which issued Jun. 13, 1989. However, it is relatively easy to manipulate the end portion of the heating element because it is a low voltage application with the other end of the heating element grounded to the nozzle body and thus there is only a single terminal wire extending to the terminal. Reliable terminals having two terminal wires are more difficult to make than terminals having only a single terminal wire because it is important that the two projecting terminal wires of the heating element extend parallel to each other and are spaced apart a predetermined distance. Also, the terminal must be structurally secure and relatively easy to manufacture without requiring two different brazing steps.

SUMMARY OF THE INVENTION

Accordingly, it is an object of the present invention to at least partially overcome the disadvantages of the prior art by providing a method of making an integral nozzle with a heating element extending outward between adjacent collar portions.

Another object of the invention is to provide a method of making an integral nozzle with a structurally secure terminal wherein two terminal wires of the heating element are spaced a predetermined distance apart and extend parallel to each other radially outward from the body of the nozzle.

To this end, in one of its aspects, the invention provides a method of making an injection molding nozzle including the steps of making an elongated steel outer body with a rear end, a forward end, a generally cylindrical outer surface, and a melt bore extending centrally therethrough from the rear end to the forward end, and integrally vacuum brazing an insulated electric heating element in a spiral channel in the outer surface of the body, the heating element having an insulated heating wire extending in an outer casing, the improvement comprising the further steps of:

(a) winding the heating element in the spiral channel with at least one end portion projecting radially outward from the channel near the rear end of the outer body of the nozzle, (b) making a steel forward collar portion with a rear face and a circular opening extending centrally therethrough, the circular opening having a predetermined diameter to fit over the outer surface of the outer body of the nozzle, (c) making a steel rearward collar portion with a rear face, a forward face, and a circular opening extending centrally therethrough, the circular opening having a predetermined diameter to fit over the outer surface of the outer body of the nozzle, making at least one of the forward collar portion and the rearward collar portion whereby a radial opening is formed between the forward collar portion and rearward collar portion when the forward face of the rearward collar portion abuts against the rearward face of the forward collar portion, (d) mounting the forward collar portion around the outer surface of the outer body of the nozzle in a position adjacent the at least one projecting end portion of the heating element, (e) mounting the rearward collar portion around the outer surface of the outer body of the nozzle with the forward face of the rearward collar portion abutting against the rearward face of the forward collar portion and the at least one end portion of the heating element projecting radially out through the radial opening formed between the forward collar portion and the rearward collar portion, (f) making a steel stud portion having an inner end, an outer end, and at least one bore extending through the stud portion from the inner end to receive the at least one projecting end portion of the heating element, (g) mounting the steel stud portion to extend radially outward from the radial opening formed between the forward collar portion and the rearward collar portion with the at least one portion of the heating element extending outwardly a predetermined distance through the at least one bore in the stud portion, (h) applying brazing material along the joins between the outer body, forward collar portion, rearward collar portion, and stud portion, and around the at least one end portion of the heating element extending through the at least one bore in the stud portion, and (i) heating the assembled outer body, heating element, forward collar portion, rearward collar portion, and stud portion above the melting temperature of the brazing material in a reduced oxygen atmosphere in a vacuum furnace according to a predetermined cycle to melt the brazing material and integrally braze the outer body, heating element, forward collar portion, rearward collar portion, and stud portion together to form a metallurgically monolithic nozzle.

DETAILED DESCRIPTION OF THE DRAWINGS

Figure 1:
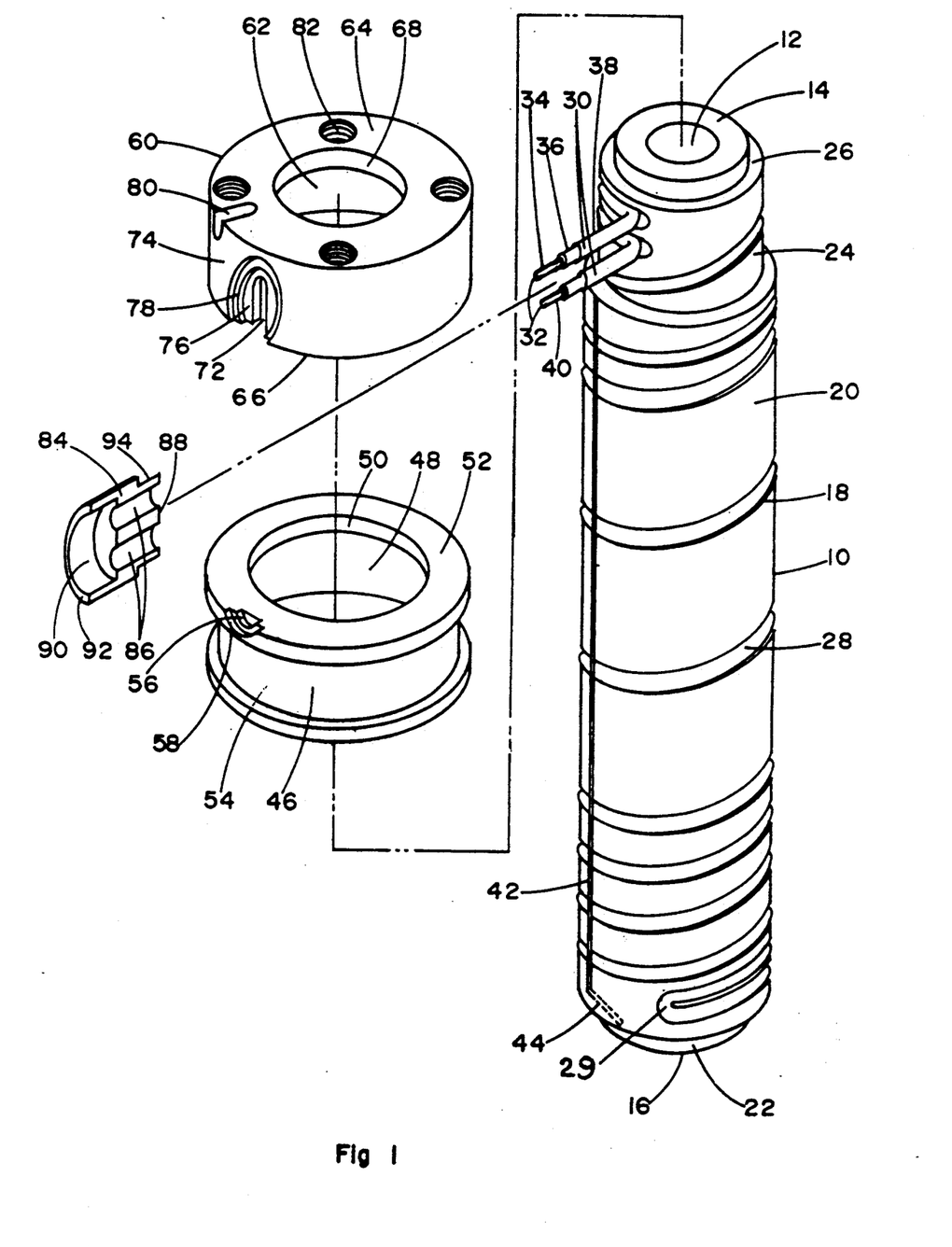
FIG. 1 is an exploded isometric view of components of the nozzle illustrating some of the steps of making the nozzle according to a preferred embodiment of the invention.
Figure 2:
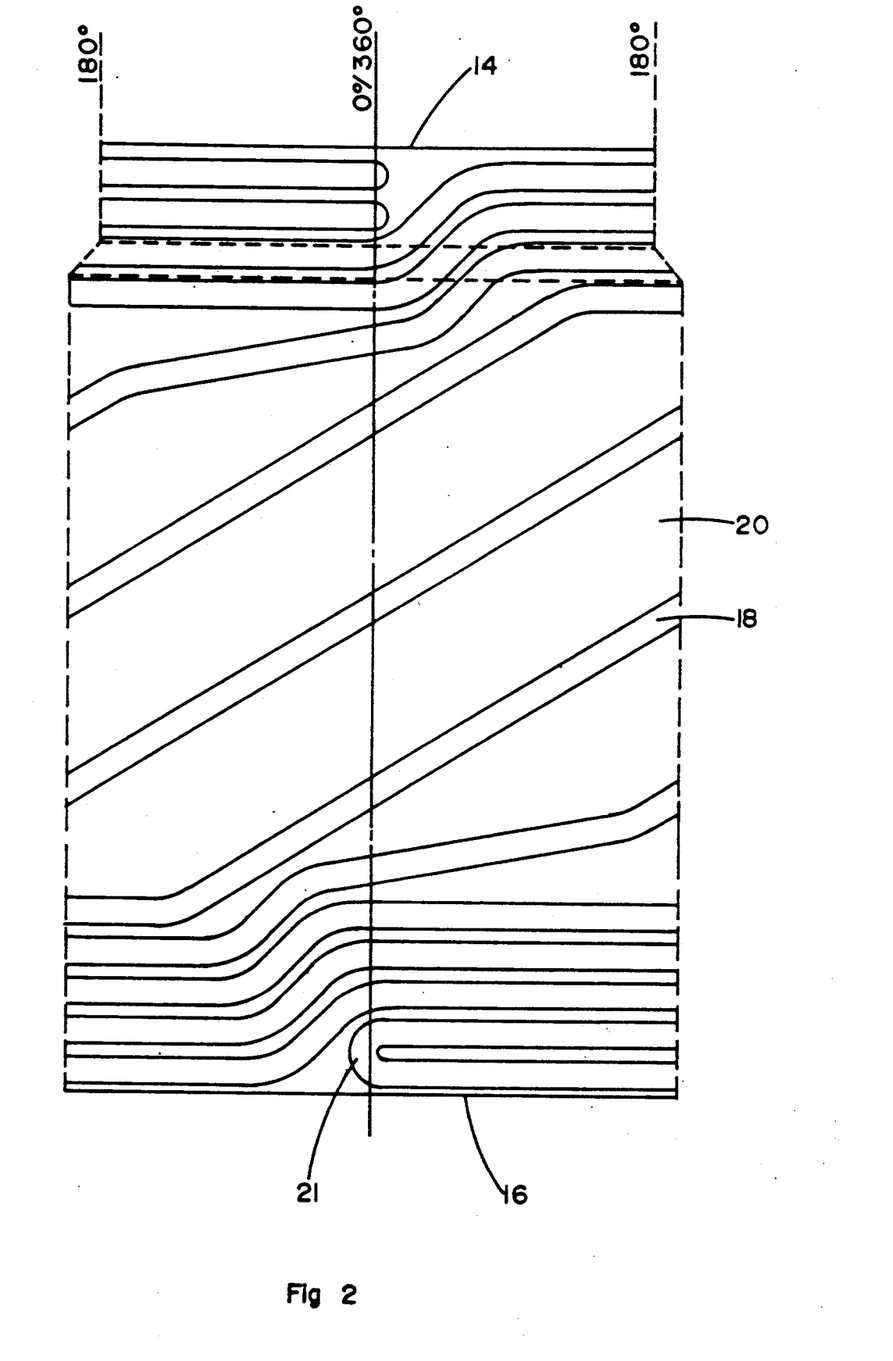
FIG. 2 is a schematic view illustrating one pattern of the heating element channel around the outer surface of the nozzle body.

Reference is first made to FIG. 1 which shows components of an injection molding nozzle having a double channel and a terminal for two terminal wires and how they are assembled. An elongated outer body 10 having a central melt bore 12 extending from a rear end 14 to a forward end 16 is made of tool steel. While the nozzle body 10 illustrated in this embodiment is made of one piece, it may also be made by joining several longitudinal sections to provide different selected sizes and lengths as described in the applicant's U.S. Pat. No. 4,945,630 which issued Aug. 7, 1990. The nozzle body 10 is made with a spiral channel 18 extending around its outer surface 20. The spiral channel 18 is a double channel which extends rearwardly from a U-shaped bend portion 21 adjacent the forward end 16 of the nozzle body 10. As illustrated in FIG. 2, the double channel 18 is made with a predetermined pattern to vary the amount of heat provided along the surface 20 of the nozzle body 10 according to the requirements of the system. In this embodiment, the double spiral channel 18 is more concentrated near the rear and forward ends 14, 16 of the outer body 10 so more heat is provided in those areas than in the middle of the body 10. While the outer surface 20 of the nozzle body 10 is generally cylindrical, in this embodiment it is made with a bevel 22 at the forward end 16, and a reduced diameter portion 24 extending from an inwardly extending seat 26 adjacent the rear end 14. An electrical heating element 28 is wound in the double spiral channel 18 with a U-shaped bend 29 received in the U-shaped bend portion 21 of the channel 18 and two end portions 30 projecting radially outward near the rear end 14 of the body 10 to two ends 32. As is well known in the art, the heating element 28 has a thin heating wire 34 which extends through an insulating material 36 such as magnesium oxide inside a steel casing 38. The heating wire 34 is connected to a terminal wire 40 at each end 32. The two terminal wires 40 have a much larger diameter than the thin heating wire 34 so they are not hot. In this embodiment, the outer casing 38 has been stripped back slightly further than the insulating material to avoid any possibility of electrical shorting occurring between the heating wire 34 and the surrounding outer casing 38. A thin hollow thermocouple tube 42 is tack welded to the outer surface 20 of the body 10 over the heating element 28 to extend longitudinally to a thermocouple bore 44 which is machined diagonally into the body 10 of the nozzle adjacent its forward end 16

A forward collar portion 46 is made of steel with a circular opening 48 of a predetermined diameter to fit over the outer surface 20 of the outer body 10. In this embodiment, the forward collar portion 46 is made with an inwardly extending rear flange portion 50 which forms a rear face 52 and an insulation flange portion 54 which extends forwardly from the rear flange portion 50. In this embodiment, the rear face 52 of the forward collar portion 46 is made with an inner segment 56 and an outer segment 58 of two seats which are described in more detail below. The forward collar portion 46 is mounted around the body 10 with the seat segments 56, 58 adjacent to and aligned with the two projecting end portions 30 of the heating element 28. If the forward collar portion 46 is made with a circular opening 48 which fits over the reduced diameter portion 24 of the outer surface 20, but is too small to slide over the forward end 16 of the body 10, it is mounted from the rear by moving it inwardly on an angle over the projecting end portions 30 of the heating element 28 and then turning it forwardly over the rear end 14 of the body 10.

Figure 3:
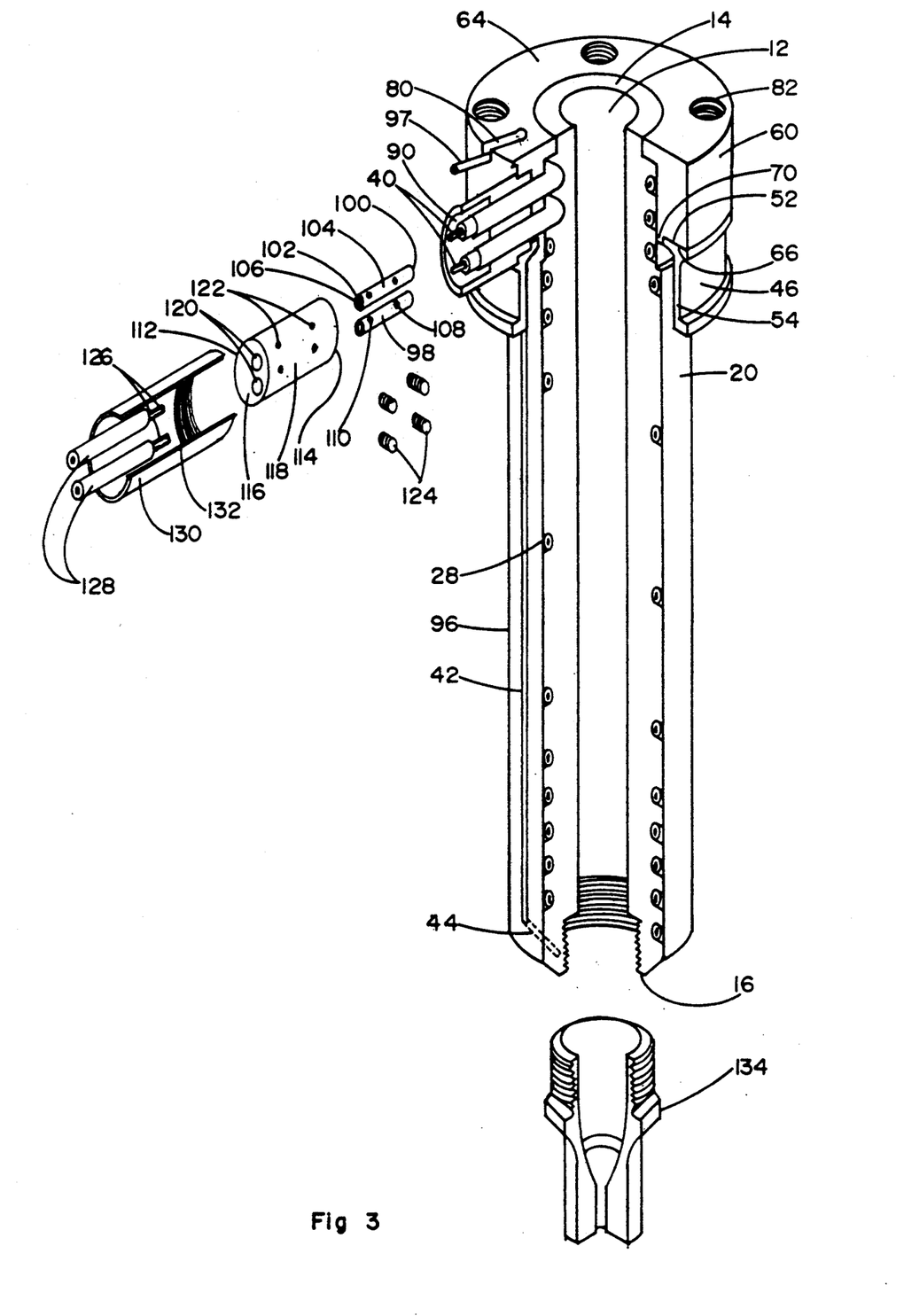
FIG. 3 is a cut-away isometric view showing additional components to illustrate further steps of making the terminal according to this embodiment of the invention.

A rearward collar portion 60 is made of steel with a circular opening 62 extending centrally from a rear face 64 to a forward face 66. In this embodiment, the circular opening 62 is made to fit around the reduced diameter portion 24 of the outer surface 20 of the body 10 and the collar portion 60 is made with an inwardly extending flange portion 68 which fits in the inwardly extending seat 26 at the rear end 14 of the body 10. Also, the forward face 66 of the rearward collar portion 60 is made with a forwardly extending inner rim 70 which interlocks with the rear face 52 of the forward collar portion 46 when they abut against each other. Of course, in other embodiments, the outer surface 20 of the body 10, the forward collar portion 46, and the rearward collar portion 60 can be made with different suitable shapes which fit together. The rearward collar portion 60 is made with a radial slot 72 therethrough extending longitudinally away from the forward face 66. The outer wall 74 of the rearward collar portion 60 has an inner seat 76 and a larger outer seat 78 which extend around the longitudinal slot 72. These outwardly open seats 76, 78 in the rearward collar portion 60 are made circular, except that, in this embodiment, a portion of each of them is formed by the matching inner and outer seat segments 56, 58 in the rear face 52 of the forward collar portion 46. The rearward collar portion 60 is made with the rear face 64 having a slot 80 to receive a thermocouple wire and threaded bolt holes 82 to receive bolts (not shown) for mounting purposes. The rearward collar portion 60 is mounted over the rear end 1 of the body 10 with the seats 76, 78 around the longitudinal slot 72 aligned with the seat segments 56, 58 in the forward collar portion 46. The forward face 66 abuts against the rear face 52 of the forward collar portion 46 with which the inner rim 70 interlocks to ensure proper location. The inwardly extending flange portion 68 is received in the seat 26 around the rear end 14 of the body 10 with the rear face 64 of the rearward collar portion 60 flush with the rear end 14 of the body 10. The end portions 30 of the heating element 28 extend outwardly through the slot 72 in the rearward collar portion 60, and the inner and outer circular seats 76, 78 around the slot 72 are partially formed by each of the forward and rearward collar portions 46, 60. In other embodiments, the forward and rearward collar portions 46, 60 may be made to combine differently to form the slot 72 or a different shaped opening between them A stud portion 84 is made of steel with two bores 86 extending from the inner end 88 to a central bore 90 extending from the outer end 92. The two bores 86 extend parallel to each other and are spaced apart a predetermined distance. Each bore 86 is just large enough to fit over one of the outwardly extending end portions 30 of the heating element 28. While the stud portion 84 is made generally cylindrical, it has a smaller diameter neck portion 94 at the inner end 88 which fits in the inner seat 76 around the longitudinal slot 72. As seen in FIG. 3, the stud portion 84 is mounted with the neck portion 94 at its inner end 88 seated in the inner seat 76 around the slot 72, and the end portions 30 of the heating element 28 extending through the two parallel bores 86. This structurally supports the outwardly projecting end portions 30 of the heating element 28 and ensures that they extend radially outward and are parallel and spaced apart a predetermined distance.

When the components described above are mounted together as seen in FIG. 3, brazing material such as nickel alloy paste is applied along the joins between them and around the two end portions 30 of the heating element 28 which extend through the two bores 86 of the stud portion 84. Brazing material is also applied along the heating element 28 wound in the spiral channel 18 similar to the description in the applicant's U.S. Pat. No. 4,557,685 which issued Dec. 10, 1985. The assembly is then inserted into a vacuum furnace (not shown) and heated above the melting temperature of the brazing material according to a predetermined cycle. As the furnace is gradually heated, it is evacuated to a relatively high vacuum to remove nearly all of the oxygen. Before the melting temperature of the brazing material is reached, the vacuum is reduced by partially backfilling with an inert gas such as argon or nitrogen. When the nickel alloy brazing material melts, it flows by capillary action along the joins between the components and around the heating element 28 to completely embed it in the channel 18. This brazing in the vacuum furnace provides a metallurgical bonding of the nickel alloy to the steel of the various components to form a metallurgically monolithic integral heated nozzle 96. After the nozzle 96 is cooled and removed from the vacuum furnace, it is machined to provide a smooth outer finish. A thermocouple bore (not shown) is machined through the forward and rearward collar portions 48, 60 to connect the thermocouple slot 80 in the rear face 66 of the rearward collar portion 60 to the thermocouple tube 42 which is now also integrally brazed along the outer surface 20 of the body 10 As seen in FIG. 3, a thermocouple wire 97 is then inserted through this thermocouple bore and thermocouple tube 42 and bent outwardly through the thermocouple slot 80 to monitor the operating temperature adjacent the forward end 16 of the body 10.

Referring more specifically to FIG. 3, a pair of elongated metal connectors 98 are made each having an inner end 100, an outer end 102, a cylindrical outer surface 104, and a longitudinal bore 106 large enough to receive bare electrical wires therein. Each connector 98 is also made with inner and outer longitudinally spaced threaded bores 108, 110 extending from the longitudinal bore 106 to the outer surface 104. Each connector 98 is mounted over the end 32 of one of the radially projecting end portions 30 of the heating element 28 with the bared wire portion 40 extending from the inner end 100 of the connector 98 into the longitudinal bore 106 past the inner threaded transverse bore 108.

An insulator 112 having an inner end 114, outer end 116, and a cylindrical outer surface 118 is made of a suitable ceramic insulating material. The insulator 112 is also made with two spaced parallel longitudinal bores 120 and two longitudinally spaced transverse openings 122 extending from each longitudinal bore 120 to the outer surface 118. The insulator 112 is mounted over the projecting connectors 98 with its inner end 114 received in the central bore 90 of the stud portion 84. Each of the metal connectors 98 is received in one of the longitudinal bores 120 of the insulator 112 with the threaded transverse bores 108, 110 in the connectors 98 aligned with the transverse openings 122 in the insulator 112. A set screw 124 is then inserted through each transverse opening 122 in the insulator 112 into the aligned threaded transverse bore 108, 110 in the connectors 98, and the set screws in the inner threaded bores 108 of the connectors 98 are tightened on the bared wire portions 40 of the projecting end portions 30 of the heating element 28 to securely connect each connector 98 to one end 32 of the heating element 28. Alternatively, the connectors 98 can first be inserted into the insulator 112 and then connected to the ends 32 of the heating element 28.

As seen in FIG. 3, a bared end 126 of an electrical external lead wire 128 can be inserted into the longitudinal bore 106 of each metal connector 98 from the outer end 102 past the outer threaded transverse bore 110. The set screw 124 in each outer threaded bore 110 is then tightened to securely connect the lead wires 128 to the connector 98. It will be appreciated that the lengths of the bared wire portions 40 of the end portions 30 of the heating element 28, the bared ends 126 of the lead wires 128, and the connectors 98 must be predetermined to ensure they are securely connected together. Also, the lengths of the end portions 30 of the heating element 28, the stud portion 84, and the insulator 112 must also be predetermined to ensure the metal connectors 98 are entirely inside the insulator 112. Finally, a hollow protective terminal sleeve 130 which was previously located over the lead wires 128 is mounted to extend outwardly from the stud portion 84 around the insulator 112. The protective sleeve 130 has a threaded inner end 132 which is screwed over the threaded stud portion 84 into the outer seat 78 around the longitudinal slot 72. In addition to protecting the connectors 98 and insulator 112, this adds structural strength to the terminal to prevent it getting bent from its correct position.

In use, a gate insert 134 or nozzle seal which is shaped to provide a desired gating configuration is mounted in the forward end 116 of the completed nozzle 96. One or more nozzles 96 are mounted in a suitable mold with the insulation flange portion 54 received in a suitable seat in a cavity plate to locate and support the nozzle. The insulation flange portion 54 which extends forwardly is spaced outwardly a predetermined distance from the outer surface 20 of the body 110 to provide thermal insulation to avoid excessive heat loss. Electrical power is provided to the heating element 28 of each nozzle 96 through the lead wires 128 to heat them to a predetermined operating temperature. Pressurized melt from a molding machine is then injected to flow through the central bore 12 of the body 110 of each nozzle 96 and into cavities through the adjacent gates. After the cavities are filled, injection pressure is held momentarily to pack and then released. After a short cooling period, the mold is opened to eject the molded products. After ejection, the mold is closed and injection pressure is reapplied to refill the cavities. This cycle is continuously repeated with a frequency dependent on the size and shape of the cavities and the type of material being molded.

Figure 4:
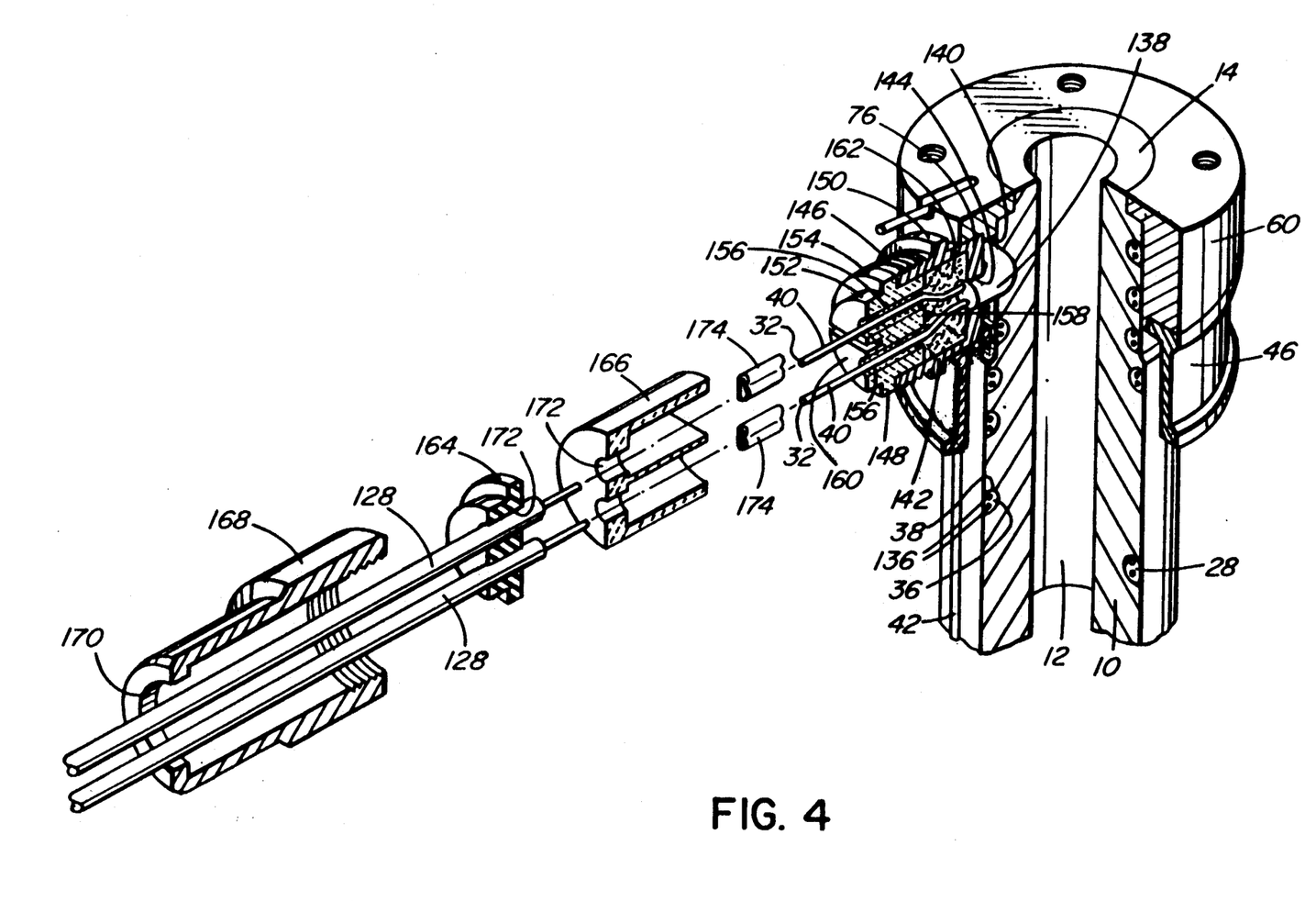
FIG. 4 is a cut-away isometric view similar to FIG. 3 showing the steps of making the nozzle according to another embodiment of the invention.

Reference is now made to FIG. 4 to describe a method of making an injection molding nozzle according to another embodiment of the invention. As some of the elements are the same or similar to those described above, common elements are described and illustrated using the same reference numerals. In this embodiment, the heating element 28 is made with a double heating wire 136 extending in the insulating material 36 in a single casing 38. Thus, rather than the entire heating element 28 including the casing 38 being made with a U-shaped bend, only the heating wire 136 itself has a U-shaped bend (not shown) near the forward end 16 of the nozzle body 10. The double heating wire 136 is connected to two larger diameter terminal wires 40 which project outwardly to two ends 32 from a single end portion 138 of the heating element 28 which extends radially outward near the rear end 14 of the body 10 of the nozzle.

The forward collar portion 46 and rearward collar portion 60 are made as described above and mounted with the single end portion 138 of the heating element 28 extending out through the opening 140 between them. In this embodiment, the steel stud portion 142 is made with only a single bore 144 extending therethrough and with a threaded portion 146 extending from the outer end 148 to a small circumferential flange 150. The stud portion 142 is mounted in the seat 76 in the forward and rearward collar portions 46, 60 with the single end portion 138 extending out through the single bore 144. The assembly is then integrally brazed together in a vacuum furnace as described above.

In this embodiment, a generally cylindrical ceramic spacer portion 152 is made with a small circumferential flange 154 and two parallel bores 156 spaced a predetermined distance apart extending from an inner end 158 to an outer end 160. The spacer portion 152 is securely mounted by ceramic paste in the stud portion 142 with the flange 154 abutting against the outer end 148 of the stud portion 142. As can be seen, the two terminal wires 40 extending from the single end portion 138 of the heating element 28 diverge in a space 162 in the stud portion 142 where they are surrounded by ceramic paste and then extend out through the two parallel bores 156 in the spacer portion 152.

In use, the connection of the two electrical lead wires 128 is completed using a disc shaped silicon rubber seal 164 and a ceramic insulative sleeve 166 which fit in a threaded steel cap 168. The seal 164 fits in an opening 170 in the outer end of the cap 168, and the seal 164 and the insulative sleeve 166 have a pair of spaced parallel bores 172 extending therethrough to receive the two lead wires 128. The cap 168, seal 164, and insulative sleeve 166 slide up the lead wires 128 out of the way and the lead wires 128 are then fastened to the projecting terminal wires 40 of the heating element 28 by electrical crimps 174. The sleeve 166, seal 164, and cap 168 are then slid down into place around the crimps 174 and the threaded cap 168 is tightened onto the threaded stud portion 142. The silicon rubber seal 164 prevents moisture entering the terminal, and this arrangement has excellent structural strength and facilitates connecting and disconnecting the lead wires 128 to the nozzle.

While the description of making the heated manifold has been given with respect to preferred embodiments, it will be evident that various modifications are possible without departing from the scope of the invention as understood by those skilled in the art and as defined in the following claims. For instance, in another embodiment the heating element 28 is made with the casing 38 having a sharp U-shaped bend so the outward and return casing 38 both extend in side by side contact in a single spiral channel 18.

The embodiments of the invention in which an exclusive property or privilege is claimed are defined as follows:

1. In a method of making an injection molding nozzle including the steps of making an elongated steel outer body with a rear end, a forward end, a generally cylindrical outer surface, and a melt bore extending centrally therethrough from the rear end to the forward end, and integrally vacuum brazing an insulated electric heating element in a spiral channel in the outer surface of the body, the heating element having an insulated heating wire extending in an outer casing, the improvement comprising the further steps of:
    (a) winding the heating element in the spiral channel with at least one end portion projecting radially outward from the channel near the rear end of the outer body of the nozzle,
    (b) making a steel forward collar portion with a rear face and a circular opening extending centrally therethrough, the circular opening having a predetermined diameter to fit over the outer surface of the outer body of the nozzle,
    (c) making a steel rearward collar portion with a rear face, a forward face, and a circular opening extending centrally therethrough, the circular opening having a predetermined diameter to fit over the outer surface of the outer body of the nozzle, making the forward collar portion and the rearward collar portion whereby a radial opening is formed between the forward collar portion and rearward portion when the forward face of the rearward collar portion abuts against the rearward face of the forward collar portion,
    (d) mounting the forward collar portion around the outer surface of the outer body of the nozzle in a position adjacent the at least one projecting end portion of the heating element,
    (e) mounting the rearward collar portion around the outer surface of the outer body of the nozzle with the forward face of the rearward collar portion abutting against the rearward face of the forward collar portion and the at least one end portion of the heating element projecting radially out through the radial opening formed between the forward collar portion and the rearward collar portion,
    (f) making a steel stud portion having an inner end, an outer end, and at least one bore extending through the stud portion from the inner end to receive the at least one projecting end portion of the heating element,
    (g) mounting the steel stud portion to extend radially outward from the radial opening formed between the forward collar portion and the rearward collar portion with the at least one portion of the heating element extending outwardly a predetermined distance through the at least one bore in the stud portion, (h) applying brazing material along the joins between the outer body, forward collar portion, rearward collar portion, and stud portion, and around the at least one end portion of the heating element extending through the at least one bore in the stud portion, and (i) heating the assembled outer body, heating element, forward collar portion, rearward collar portion, and stud portion above the melting temperature of the brazing material in a reduced oxygen atmosphere in a vacuum furnace according to a predetermined cycle to melt the brazing material and integrally braze the outer body, heating element, forward collar portion, rearward collar portion, and stud portion together to form a metallurgically monolithic nozzle.

2. A method of making an injection molding nozzle as claimed in claim 1 including making the spiral channel in the outer surface of the body with a double channel extending rearwardly in a predetermined pattern from a U-shaped bend portion adjacent the forward end of the body, winding the heating element in the double channel whereby the heating element has a U-shaped bend received in the bend portion of the channel, and two end portions projecting radially outward from the channel near the rear end of the outer body of the nozzle to two ends of the heating element, making the stud portion with two parallel bores spaced a predetermined distance apart extending therethrough, and mounting the forward collar portion, rearward collar portion, and stud portion with the two end portions of the heating element projecting radially out through the radial opening formed between the forward collar portion and the rearward collar portion and through the two bores in the stud portion.

3. A method of making an injection molding nozzle as claimed in claim 2 further including making at least one of the forward collar portion and rearward collar portion whereby a seat is formed around the radial opening between the forward collar portion and rearward collar portion and mounting the stud portion with the inner end of the stud portion received in said seat.

4. A method of making an injection molding nozzle as claimed in claim 3 further including making the forward collar portion with a forwardly extending insulation flange portion which is spaced outwardly a predetermined distance from the outer surface of the body of the nozzle.

5. A method of making an injection molding nozzle as claimed in claim 3 further including making the body of the nozzle with a reduced outer diameter portion adjacent the rear end and making at least the rearward collar portion to fit over the reduced diameter portion of the body of the nozzle.

6. A method of making an injection molding nozzle as claimed in claim 3 further including making the body of the nozzle with an inwardly extending seat adjacent the rear end and making the rearward collar portion with an inwardly extending flange portion which is received in said seat in said body whereby the rear end of the rearward collar portion is substantially flush with the rear end of the body of the nozzle.

7. A method of making an injection molding nozzle as claimed in claim 3 further including making the rear face of the forward collar portion and the forward face of the rearward collar portion to interlock when mounted to abut together.

8. A method of making an injection molding nozzle as claimed in 3 wherein the radially projecting end portions of the heating element are longitudinally aligned and further including making the forward collar portion and the rearward collar portion whereby the radial opening through which the two end portions of the heating element extend between the forward collar portion and the rearward collar portion is a longitudinally extending slot to receive the longitudinally aligned end portions of the heating element.

9. A method of making an injection molding nozzle as claimed in claim 8 further including making the rearward collar portion with said slot extending rearwardly from the forward face of the rearward collar portion.

10. A method of making an injection molding nozzle as claimed in claim 3 further including making the stud portion generally cylindrical with a central bore extending a predetermined distance from the outer end to join the two bores extending from the inner end.

11. A method of making an injection molding nozzle as claimed in claim 3 wherein each end portion of the heating element has a bare terminal wire extending outwardly to the respective end of the heating element and including the further steps of:

(j) making a pair of elongated metal connectors, each connector having a cylindrical outer surface, an inner end, an outer end, a longitudinal bore extending therethrough from the inner end to the outer end to receive one of the bare terminal wires of the heating element therein, and an inner and an outer longitudinally spaced threaded transverse bore extending from the longitudinal bore to the outer surface to receive set screws therein, (k) mounting each metal connector with one of the bare terminal wires of the heating element extending through the inner end of the connector into the longitudinal bore past the inner threaded transverse bore, (l) making an insulator having a cylindrical outer surface, an inner end, an outer end, two parallel spaced longitudinal bores extending therethrough from the inner end to the outer end to receive the metal connectors therein, and two longitudinally spaced transverse openings extending from each longitudinal bore to the outer surface to insert set screws therethrough, (m) mounting the insulator with the inner end received in the central bore of the stud portion and each of the metal connectors received in one of the longitudinal bores of the insulator with the threaded transverse bores in the connectors aligned with the transverse openings in the insulator, inserting a set screw through each transverse opening in the insulator into the aligned threaded transverse bore in the connectors, and tightening the set screws in the inner threaded transverse bores of the connectors to securely connect each connector to the bare terminal wire of the heating element extending therein, whereby a bared end of an external lead wire can be inserted into the longitudinal bore of each metal connector from the outer end past the outer threaded transverse bore and securely connected to the connector by tightening the set screw in the outer threaded transverse bore of the connector.

12. A method of making an injection molding nozzle as claimed in claim 11 further including threading the outer end of the stud portion and providing a hollow protective terminal sleeve having a threaded inner end to be mounted on the outer end of the stud portion after the external lead wires are connected to extend outwardly over the insulator to at least the outer end of the insulator.

13. A method of making an injection molding nozzle as claimed in claim 1 including making the heating element with a double heating wire in a single casing, with a pair of spaced terminal wires extending from the double heating wire, winding the heating element in the spiral channel with a single end portion projecting radially outward from the channel near the rear end of the outer body of the nozzle with the pair of spaced terminal wires projecting outward from the single end portion of the heating element, making the stud portion with a single bore extending therethrough, and mounting the forward collar portion, rearward collar portion, and stud portion with the single end portion of the heating element projecting radially out through the radial opening formed between the forward collar portion and the rearward collar portion and through the single bore in the stud portion.

14. A method of making an injection molding nozzle as claimed in claim 13 including making a spacer portion having an inner end, an outer end, and two parallel bores spaced a predetermined distance apart extending therethrough from the inner end to the outer end, and mounting the spacer portion on the stud portion with the pair of terminal wires extending outwardly a predetermined distance through the two bores in the spacer portion.

15. A method of making an injection molding nozzle as claimed in claim 14 wherein the spacer portion is made of ceramic.

* * * * *